United States Patent
Ko et al.

(10) Patent No.: US 7,220,026 B2
(45) Date of Patent: May 22, 2007

(54) OPTICAL FILM HAVING A STRUCTURED SURFACE WITH OFFSET PRISMATIC STRUCTURES

(75) Inventors: Byung-Soo Ko, Hwasung (KR); Mark E. Gardiner, Santa Rosa, CA (US); Dongwon Chae, Hwasung (KR)

(73) Assignee: 3M Innovative Properties Company, St. Paul, MN (US)

( * ) Notice: Subject to any disclaimer, the term of this patent is extended or adjusted under 35 U.S.C. 154(b) by 106 days.

(21) Appl. No.: 11/026,938

(22) Filed: Dec. 30, 2004

(65) Prior Publication Data

US 2006/0152943 A1   Jul. 13, 2006

(51) Int. Cl.
 *F21V 5/04*  (2006.01)
(52) U.S. Cl. .................... 362/339; 362/620
(58) Field of Classification Search ............... 362/339, 362/330, 620
See application file for complete search history.

(56) References Cited

U.S. PATENT DOCUMENTS

| | | | |
|---|---|---|---|
| 3,213,753 A | 10/1965 | Rogers | |
| 3,349,238 A | 10/1967 | Kruger | |
| 3,532,876 A | 10/1970 | Muller et al. | |
| 3,912,021 A | 10/1975 | Cloup | |
| 4,576,850 A | 3/1986 | Martens | |
| 5,254,390 A | 10/1993 | Lu | |
| 5,592,332 A | 1/1997 | Nishio et al. | |
| 5,919,551 A | 7/1999 | Cobb, Jr. et al. | |
| 5,932,626 A | 8/1999 | Fong | |
| 6,157,486 A | 12/2000 | Benson, Jr. | |
| 6,174,064 B1 | 1/2001 | Kalantar et al. | |
| 6,208,466 B1 | 3/2001 | Liu | |
| 6,280,063 B1 | 8/2001 | Fong et al. | |
| 6,347,874 B1 | 2/2002 | Boyd et al. | |
| 6,368,699 B1 | 4/2002 | Gilbert | |
| 6,429,919 B1 | 8/2002 | Takatsuka et al. | |
| 6,469,755 B1 | 10/2002 | Adachi et al. | |
| 6,505,959 B2 | 1/2003 | Masaki et al. | |
| 6,602,596 B2 | 8/2003 | Kimura et al. | |
| 6,606,133 B1 | 8/2003 | Okabe | |
| 6,709,143 B2 | 3/2004 | Harada et al. | |
| 6,752,505 B2 * | 6/2004 | Parker et al. ............... 362/627 |

(Continued)

FOREIGN PATENT DOCUMENTS

EP    0 621 500    10/1994

(Continued)

OTHER PUBLICATIONS

Trace Pro, Software for Opto-Mechanical Modeling User's Manual, Release 3.0, Chapter 1, Introduction and pp. 3.25-3.34 and 4.1-4.4.

*Primary Examiner*—Laura K. Tso
(74) *Attorney, Agent, or Firm*—Anna A. Wetzels (57) ABSTRACT

The present disclosure is directed to optical films having a first surface and a structured surface, the structured surface comprising a plurality of prismatic structures. Each prismatic structure has a base including at least two first sides and at least two second sides. At least one of the first and second sides of at least one of the plurality of prismatic structures is offset with respect to at least one of the first and second sides of at least one other prismatic structure.

22 Claims, 8 Drawing Sheets

U.S. PATENT DOCUMENTS

| | | |
|---|---|---|
| 6,825,984 B2 * | 11/2004 | Kashima et al. ............ 359/599 |
| 6,997,595 B2 | 2/2006 | Mi et al. |
| 2001/0028412 A1 | 10/2001 | Ito |
| 2001/0046134 A1 * | 11/2001 | Masaki et al. ............... 362/339 |
| 2001/0053075 A1 | 12/2001 | Parker et al. |
| 2002/0008899 A1 | 1/2002 | Tanaka et al. |
| 2002/0080598 A1 | 6/2002 | Parker |
| 2002/0097496 A1 | 7/2002 | Lu |
| 2003/0082314 A1 | 5/2003 | Higashi |
| 2003/0117791 A1 | 6/2003 | Kim |
| 2003/0164906 A1 | 9/2003 | Arakawa |
| 2004/0114346 A1 | 6/2004 | Parker et al. |
| 2004/0130790 A1 | 7/2004 | Sales |
| 2005/0024754 A1 | 2/2005 | Epstein et al. |
| 2005/0099822 A1 | 5/2005 | Choi et al. |
| 2005/0099823 A1 | 5/2005 | Choi et al. |
| 2005/0248848 A1 | 11/2005 | Whitehead |
| 2006/0002149 A1 | 1/2006 | Lee |
| 2006/0039073 A1 | 2/2006 | Lee |
| 2006/0146566 A1 | 7/2006 | Ko et al. |
| 2006/0152943 A1 | 7/2006 | Ko et al. |

FOREIGN PATENT DOCUMENTS

| | | |
|---|---|---|
| EP | 0 650 077 | 4/1995 |
| EP | 1 055944 | 11/2000 |
| EP | 1 098 209 | 5/2001 |
| EP | 1 491 919 A | 12/2004 |
| JP | 06308485 | 11/1994 |
| JP | HEI-7-159607 | 6/1995 |
| JP | 1996166502 A | 6/1996 |
| JP | 8-271888 | 10/1996 |
| JP | 2003240911 | 8/2003 |
| KR | 2003-0065102 | 8/2003 |
| WO | 2006/055112 | 5/2006 |
| WO | 2006/073616 | 7/2006 |

* cited by examiner

OPTICAL FILM HAVING A STRUCTURED SURFACE WITH OFFSET PRISMATIC STRUCTURES

FIELD OF INVENTION

The present disclosure relates generally to light transmissive optical films and, in particular, to optical films with plurality of prismatic structures structures disposed in an offset arrangement.

BACKGROUND INFORMATION

A liquid crystal display ("LCD") is used in a variety of applications including, for example, televisions, hand-held devices, digital still cameras, video cameras, and computer monitors. An LCD offers several advantages over a traditional cathode ray tube ("CRT") display such as decreased weight, unit size and power consumption, as well as increased brightness. However, an LCD is not self-illuminating and, therefore, in some applications, requires a backlighting assembly or "backlight." A backlight typically couples light from a substantially linear source (e.g., a cold cathode fluorescent tube ("CCFT")) or light emitting diode ("LED") to a substantially planar output. The planar output is then coupled to the LCD.

The performance of an LCD is often judged by its brightness. The brightness of an LCD may be enhanced by using more or brighter light sources. In large area displays it is often necessary to use a direct-lit type LCD backlight to maintain brightness, because the space available for light sources grows linearly with the perimeter, while the illuminated area grows as the square of the perimeter. Therefore, LCD televisions typically use a direct-lit backlight instead of a light-guide edge-lit type LCD backlight. Additional light sources and/or a brighter light source may consume more energy, which is counter to the ability to decrease the power allocation to the display device. For portable devices this may correlate to decreased battery life. Also, adding a light source to the display device may increase the product cost and sometimes can lead to reduced reliability of the display device.

The brightness of an LCD also may be enhanced by efficiently utilizing the light that is available within the LCD (e.g., to direct more of the available light within the display device along a preferred viewing axis). For example, Vikuiti™ Brightness Enhancement Film ("BEF"), available from 3M Corporation, has prismatic surface structures, which redirect some of the light outside the viewing range to be substantially along the viewing axis, and recycle via multiple reflections some of the light between the BEF and the backlight. This results in optical gain substantially along the viewing axis, and also results in improved spatial uniformity of the illumination of the LCD. Thus, BEF is advantageous because it enhances brightness and improves spatial uniformity. For a battery powered portable device, this may translate to longer running times or smaller battery size, and a display that provides a better viewing experience.

SUMMARY

The present disclosure is directed to optical films having a first surface and a structured surface, the structured surface comprising a plurality of prismatic structures. Each structure has a base including at least two first sides and at least two second sides. At least one of the first and second sides of at least one of the plurality of prismatic structures is offset with respect to at least one of the first and second sides of at least one other prismatic structure.

In one exemplary implementation, the present disclosure is directed to optical films having a first surface and a structured surface, the structured surface comprising a plurality of prismatic structures. Each structure has a base including at least two first sides and at least two second sides. At least one of the first and second sides of at least one of the plurality of prismatic structures is transversely offset with respect to at least one of the first and second sides of at least one other prismatic structure.

In another exemplary implementation, the present disclosure is directed to optical films having a first surface and a structured surface, the structured surface comprising a plurality of prismatic structures. Each structure has a base including at least two first sides and at least two second sides. At least one of the first and second sides of at least one of the plurality of prismatic structures is angularly offset with respect to at least one of the first and second sides of at least one other prismatic structure.

BRIEF DESCRIPTION OF DRAWINGS

So that those of ordinary skill in the art to which the subject invention pertains will more readily understand how to make and use the subject invention, exemplary embodiments thereof are described in detail below with reference to the drawings, wherein.

DETAILED DESCRIPTION

The present disclosure is directed to an optical film capable of controlling the distribution of light from a light source and, in some exemplary embodiments, for controlling light distribution along two different directions. The optical film according to the present disclosure may be useful in controlling the light distribution for an LCD backlight (e.g., LCD backlights shown in FIGS. 1A–1D).

Figure 1A:
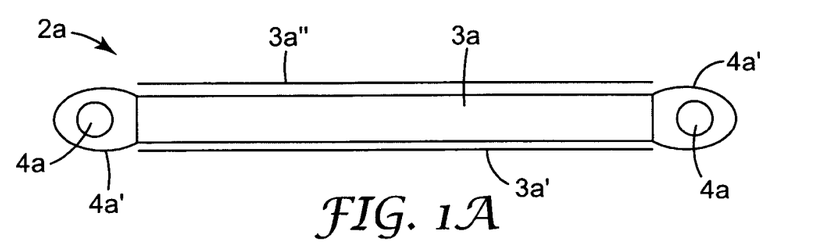
FIG. 1A shows schematically a planar lightguide edge-lit backlight.
Figure 1B:
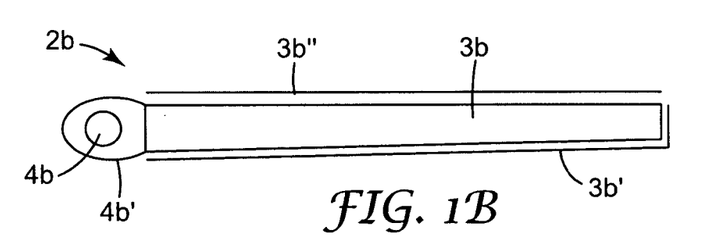
FIG. 1B shows schematically a wedge lightguide edge-lit backlight.
Figure 1C:
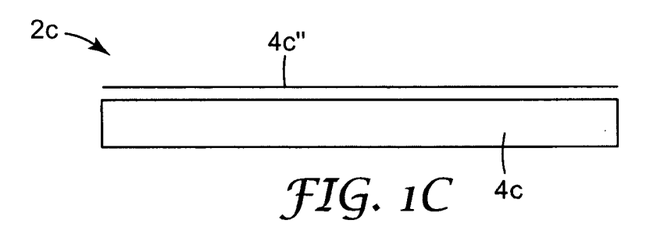
FIG. 1C shows schematically a backlight utilizing an extended light source.
Figure 1D:
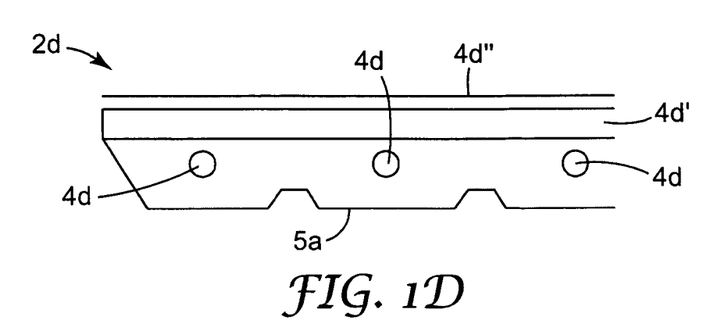
FIG. 1D shows schematically a direct-lit type backlight.

FIGS. 1A–1D show several examples of optical devices, such as backlights that may be used in LCDs. FIG. 1A shows a backlight 2a. The backlight 2a includes light sources 4a, such as one or more cold cathode fluorescent tubes ("CCFT") or arrays of LEDs, that provide light from different sides or edges of the backlight, lamp reflectors 4a' disposed about the light sources 4a, a lightguide 3a, which is illustrated as a substantially planar lightguide, a back reflector 3a' and optical films 3a", which may be any suitable optical films. FIG. 1B shows a backlight 2b including a light source 4b, such as one or more CCFTs or arrays of LEDs, a lamp reflector 4b' disposed about the light source 4b, a lightguide 3b, which is illustrated as a wedge-shaped lightguide, a back reflector 3b' and optical films 3b", which may be any suitable optical films. FIG. 1C shows a backlight 2c, which includes an extended light source 4c and any suitable optical films 4c". Exemplary suitable extended light sources include surface emission-type light sources. FIG. 1D shows a backlight 2d, which includes three or more light sources (e.g. CCFTs or LEDs) 4d, a back reflector 5a, a diffuser plate 4d' and optical films 4d", which may be any suitable optical films.

Such backlights may be used in various optical devices, and, particularly, display devices such as LCD devices (e.g., televisions, monitors, etc). As one of ordinary skill in the art will understand, a display device may include a case having a window, a backlight situated in the case, an optical film according to the present disclosure, and a light valve arrangement, such as an LCD panel, situated between the optical film and the optical window. The optical film according to the present disclosure also may be used in conjunction with any other light source known to those of ordinary skill in the art and the display device may include any other suitable elements.

Figure 2:
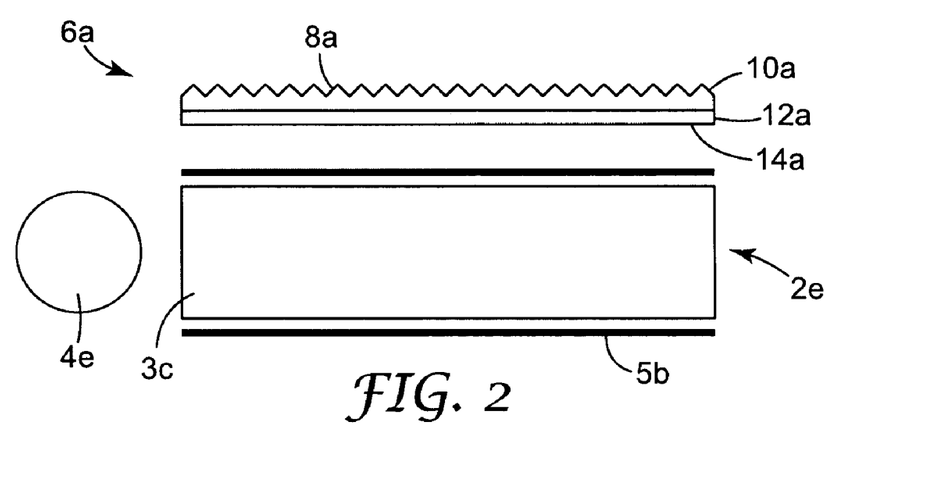
FIG. 2 shows schematically an exemplary embodiment of an optical film according to the present disclosure positioned over a backlight.

FIG. 2 shows a cross-sectional view of a backlight 2e and an optical film 6a according to the present disclosure. The backlight 2e may include a light source 4e, a lightguide 3c, and a back reflector 5b. The optical film 6a may be disposed over the backlight 2e. The optical film 6a according to the present disclosure includes a first surface 14a, which may be a substantially planar surface, a structured surface 10a and, in some exemplary embodiments, a substrate portion 12a. The optical film 6a may be characterized by an axis, which in some embodiments is substantially perpendicular to the first surface or the substrate portion 12a and in other exemplary embodiments makes a different angle with respect to the first surface or the substrate portion 12a. The angle of the axis with respect to the first surface or the substrate portion will be determined by the main viewing direction of the display with respect to the plane of the display. In typical embodiments of the present disclosure, the body axis is substantially collinear with an intended viewing direction of a display device in which the optical films of the present disclosure can be used.

The structured surface 10a includes a plurality of generally pyramid-shaped prismatic structures 8a, which in some exemplary embodiments are rectangular-based pyramids or prisms. In other exemplary embodiments, the prismatic structures 8a are square-based pyramids or prisms. Exemplary prismatic structures suitable for use in the embodiments of the present disclosure are also described in a commonly owned U.S. patent application Ser. No. 10/989,161, filed on Nov. 15, 2004, entitled "Optical Film Having A Structured Surface With Rectangular Based Prisms," the disclosure of which is hereby incorporated by reference herein to the extent it is not inconsistent with the present disclosure. The prismatic structures 8a may be disposed in the structured surface 10a in close proximity to one another and, in some exemplary embodiments, in substantial contact (e.g., immediately adjacent) with one another. The prismatic structures 8a may be offset with respect to one another, transversely in one dimension or two-dimensionally or angularly. In some exemplary embodiments, the structures 8a may be arranged in a random distribution.

In some exemplary embodiments, the prismatic structures 8a may be spaced from each other at any suitable distance provided that the gain of the optical film 6a is at least about 1.1. For example, the structures 8a may be spaced apart to the extent that the structures occupy at least about 50% of a given useful area of the structured surface 10a, or, in other exemplary embodiments, the structures 8a may be spaced further apart to the extent that the structures occupy no less than about 18% of a given useful area of the structured surface 10a. Some exemplary embodiments of the present disclosure are expected to have an optical gain of at least about 1.2, at least about 1.3, or at least about 1.5.

For the purposes of the present disclosure, the term "gain" refers to the ratio of the axial output luminance of an optical system with an optical film constructed according to the present disclosure to the axial output luminance of the same optical system without such optical film. In typical embodiments of the present disclosure, the size, shape and angles of the prismatic structures are selected to provide an optical gain of at least 1.1. In addition, the spacing, size, shape and angles of the prismatic structures may be selected based on the desired output distribution of light, but the structures should not be so small as to cause diffraction and at least one dimension of the structures should not be so large as to be seen with an unaided eye. The latter typically occurs for about 100 or 150 micron or larger structures. In some exemplary embodiments that are particularly suitable for use in direct-lit backlights, the spacing, size, shape and angles of the prismatic structures can be chosen so that the optical films of the present disclosure aid in hiding light sources from the viewer.

Referring further to FIG. 2, the structured surface 10a may be disposed over the substrate portion 12a. As one of ordinary skill in the art would understand, the optical film 6a may be used to change the direction or, in some exemplary embodiments, other characteristics of light rays emitted from the backlight 2e. For example, some exemplary embodiments of the present disclosure allow for the control of the angular spread of light using the prismatic structures 8a of the optical film 6a.

The substrate portion 12a may include an optical film having an additional optical characteristic that is different from the optical characteristics of the structured surface 10a. For example, the optical film may manipulate light in a way that is different from the way light is manipulated by the structured surface 10a. Such manipulation may include polarization, diffusion or additional redirection of light entering the optical films of the present disclosure. Exemplary suitable films having such additional characteristics include, but are not limited to, a polarizer film, a diffuser film, a brightness enhancing film such as BEF, a turning film and any combination thereof. Turning film may be, for example, a reversed prism film (e.g., inverted BEF) or another structure that redirects light in a manner generally similar to that of a reversed prism film. In some exemplary embodiments, the substrate portion 12a may include a linear reflective polarizer, e.g., a multilayer reflective polarizer, such as Vikuity™ Dual Brightness Enhancement Film ("DBEF"), or a diffuse reflective polarizer having a continuous phase and a disperse phase, such as Vikuity™ Diffuse Reflective Polarizer Film ("DRPF"), both available from 3M Company. In other exemplary embodiments, the substrate portion may include a polycarbonate layer ("PC"), a poly methyl methacrylate layer ("PMMA"), a polyethylene terephthalate ("PET") or any other suitable film or material known to those of ordinary skill in the art.

Figure 3A:
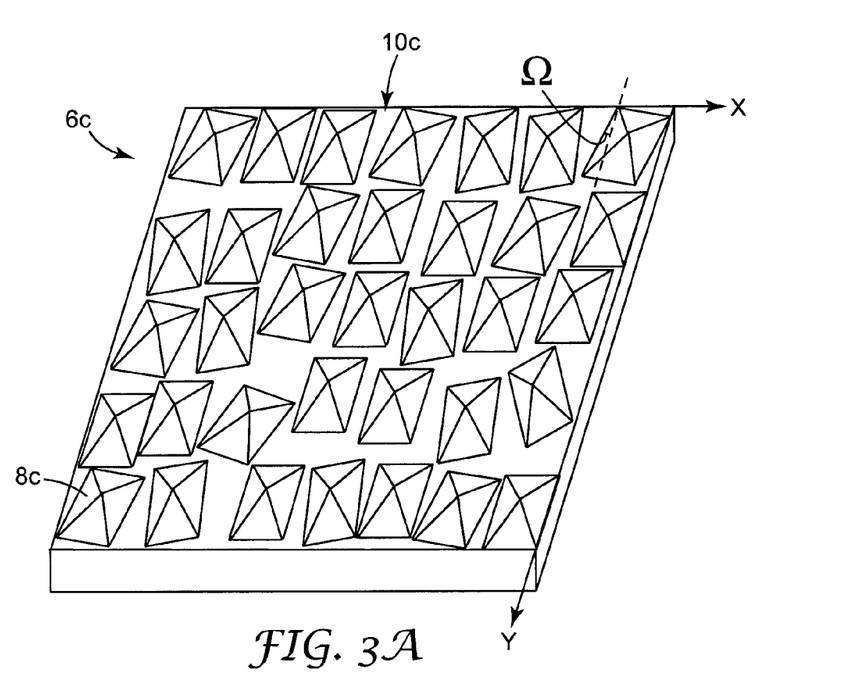
FIG. 3A shows schematically an isometric view of an exemplary embodiment of an optical film according to the present disclosure.
Figure 3B:
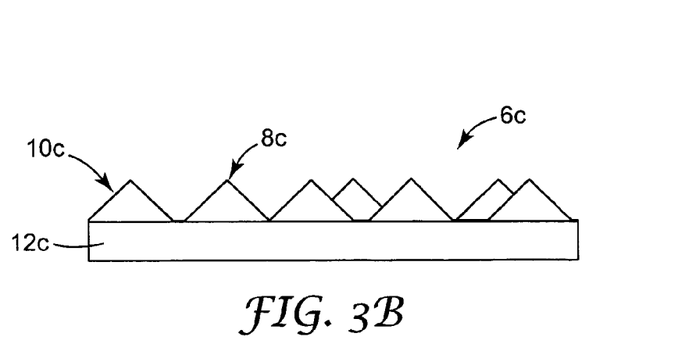
FIG. 3B shows schematically a side view of the optical film illustrated in FIG. 3A.

FIGS. 3A and 3B show an exemplary embodiment of an optical film 6c according to the present disclosure. A structured surface 10c and a substrate portion 12c may be a single film as shown in FIGS. 3A and 3B. In the exemplary embodiment shown, the structured surface 10c includes a plurality of rectangular-based prismatic structures 8c, each having two pairs of substantially parallel sides disposed opposite one another along the first and second general directions respectively. The exemplary prismatic structures 8c are arranged such that the sides of at least two neighboring structures are non-parallel to each other and also may be arranged such that sides of at least one of the prismatic structures are non-parallel to either the X direction or the Y direction. Instead, at least one of the pairs of sides of at least one of the prismatic structures is disposed at an angle with respect to at least one pair of sides of at least one other prismatic structure, as illustrated in FIG. 3A by the angle $\Omega$, which angle may vary from structure to structure across the structured surface 10c. In some exemplary embodiments, the angle $\Omega$ varies randomly across the surface 10c.

Such exemplary embodiments are referred to as having prismatic structures with sides that are angularly offset with respect to each other. An exemplary arrangement of the prismatic structures 8c that are angularly offset with respect to each other may aid in widening a viewing angle along a particular direction or directions or in reducing or eliminating Moire patterns. Those of ordinary skill in the art will readily appreciate that prismatic structures of other configurations may be used in this exemplary embodiment, for example, square-based prismatic structures. In some exemplary embodiments, prismatic structures of varying sizes and/or configurations may be used.

As one of ordinary skill in the art would understand, the structured surface 10c and the substrate portion 12c may be formed as a single part to produce the optical film 6c, or they may be formed separately and then joined together to produce a single part. The optical film 6c may be manufactured by any method known to those of ordinary skill in the art including, but not limited to, embossing, casting, compression molding, and batch processes.

In an exemplary method of manufacturing an optical film according to the present disclosure, a micro-structured form tool, and optionally an intermediate form tool, may be utilized to form the optical film (e.g. optical film 6c). The micro-structured form tool may be made, for example, by cutting groves in two directions on a suitable substrate. As one of ordinary skill in the art will understand, the resultant micro-structured form tool will include a plurality of prismatic structures resembling the desired optical film. The depth of the cut and spacing between each cut may be adjusted depending on whether prismatic structures with sharp points, flats, or sharp lines along the peaks are desired and depending on other relevant parameters.

An intermediary form tool with a reverse or opposite structure to the micro-structured form tool (e.g. inverted prismatic structures) may be manufactured from the micro-structured form tool using, for example, an electro-plating method or polymer replication. The intermediary form tool may be comprised of polymers including, for example, polyurethane, polypropylene, acrylic, polycarbonate, polystyrene, a UV cured resin, etc. The intermediate tool may be coated with a release layer in order to facilitate release of the final optical film.

As one of ordinary skill in the art will understand, the intermediary form tool may be used to manufacture the optical film (e.g., optical film 6c) via direct replication or a batch process. For example, the intermediary form tool may be used to batch process the optical film 6c by such methods as injection molding, UV curing, or thermoplastic molding, such as compression molding. The optical film according to the present disclosure may be formed of or include any suitable material known to those of ordinary skill in the art including, for example, inorganic materials such as silica-based polymers, and organic materials, such as polymeric materials, including monomers, copolymers, grafted polymers, and mixtures or blends thereof In some exemplary embodiments, a portion with the structured surface may be formed from materials having a refractive index lower then that of the substrate portion. In such exemplary embodiments, for a polyethylene terephthalate substrate portion having a refractive index of about 1.66, a preferred range of refractive indices of the portion carrying the structured surface is from about 1.55 to about 1.65, which is the case for acrylic with the refractive index of about 1.58.

Figure 4A:
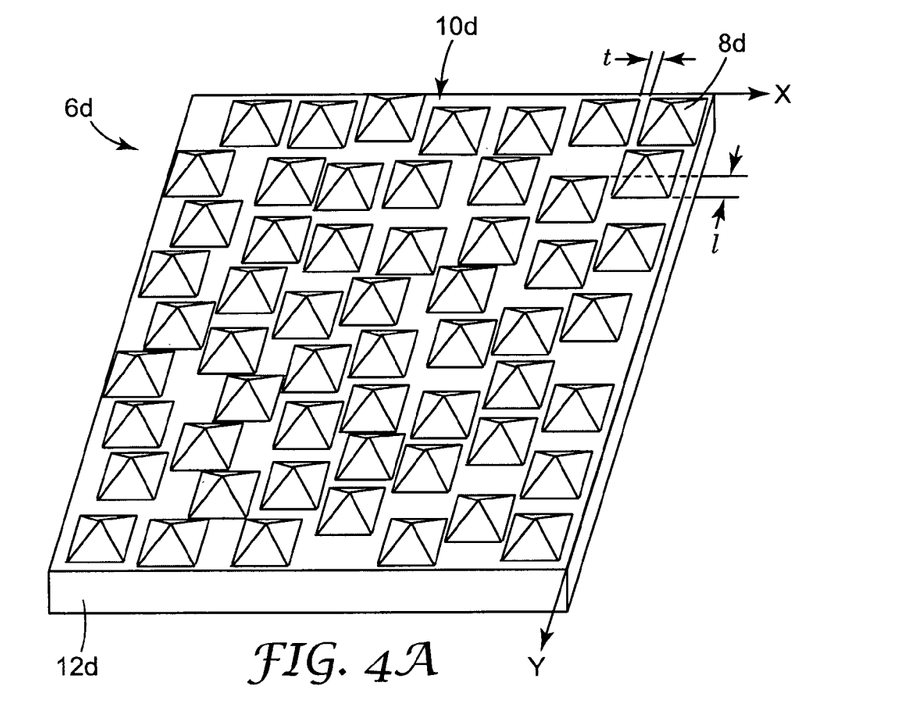
FIG. 4A shows schematically an isometric view of another exemplary embodiment of an optical film according to the present disclosure.
Figure 4B:
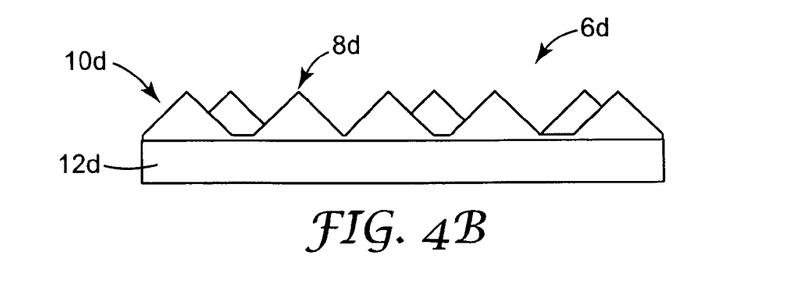
FIG. 4B shows schematically a side view of the optical film illustrated in FIG. 4A.

FIGS. 4A and 4B show an exemplary embodiment of an optical film 6d according to the present disclosure. The exemplary optical film 6d includes a plurality of square-based prismatic structures 8d on a structured surface 10d. The prismatic structures 8d are arranged so that their sides are substantially parallel to one another and so that the sides of two or more individual prismatic structures 8d are transversely offset with respect to each other, two-dimensionally along both X and Y directions. In the exemplary embodiment illustrated in FIG. 4A, one of the exemplary prismatic structures 8d is transversely offset by distances t and l with respect to two of its neighboring prismatic structures, and one or both of the distances t and l may vary from structure to structure across the structured surface 10d. In some exemplary embodiments, one or both distances may vary randomly across the surface 10d. Those of ordinary skill in the art will readily appreciate that prismatic structures of other configurations may be used in this exemplary embodiment, for example, square-based prismatic structures. In some exemplary embodiments, prismatic structures of varying sizes and/or configurations may be used.

Figure 5A:
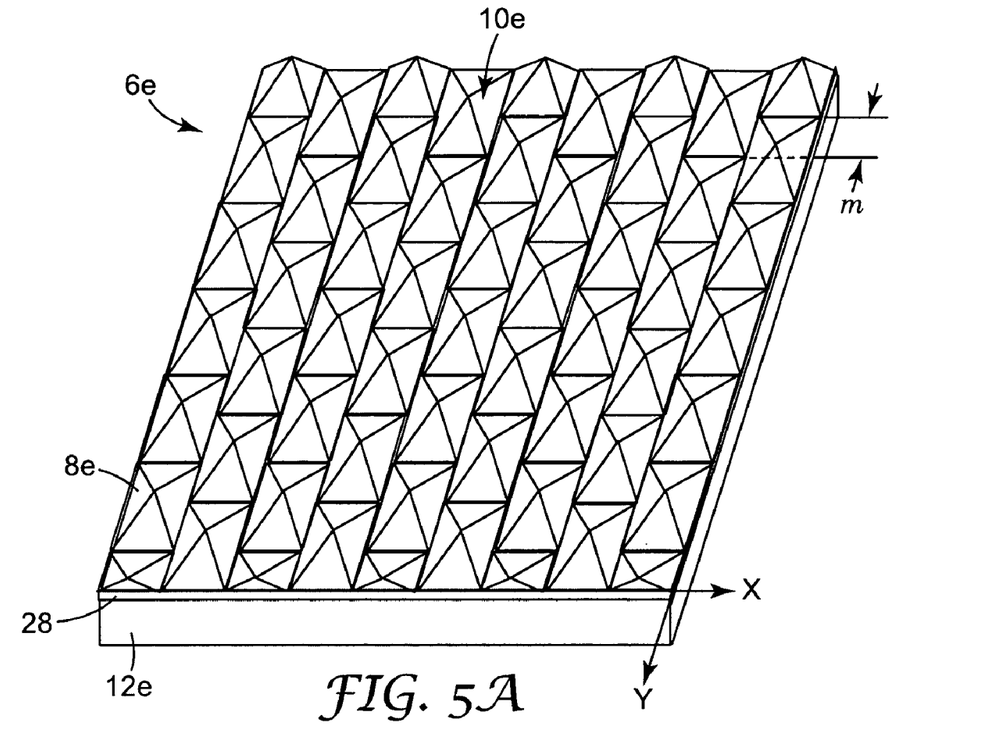
FIG. 5A shows schematically an isometric view of a further exemplary embodiment of an optical film according to the present disclosure.
Figure 5B:
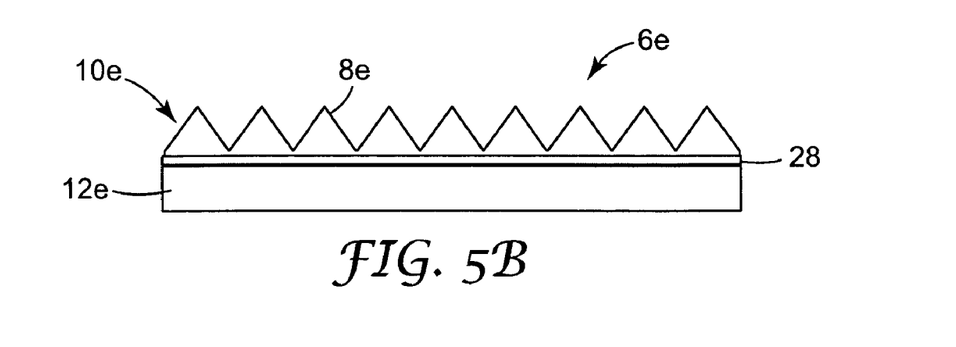
FIG. 5B shows schematically a side view of the optical film illustrated in FIG. 5A.

FIGS. 5A and 5B show an exemplary optical film 6e, including a plurality of rectangular-based prismatic structures 8e in an offset distribution, such that the sides of the individual prismatic structures that are disposed along the X direction are transversely offset with respect to each other by a distance m. In addition, the prismatic structures 8e of this exemplary embodiment are arranged so that their sides are substantially parallel to one another and so that the sides disposed along the Y direction are aligned with each other. The distance m may vary from structure to structure across the structured surface 10e. In some exemplary embodiments, the distance may vary randomly across the surface 10e. Those of ordinary skill in the art will readily appreciate that prismatic structures of other configurations may be used in this exemplary embodiment, for example, square-based prismatic structures. In some exemplary embodiments, prismatic structures of varying sizes and/or configurations may be used. The prismatic structures 8d/8e may be positioned apart from one another, or they may be in substantially close contact with one another as illustrated in FIGS. 5A and 5B. In some exemplary embodiments, prismatic structures may be offset with respect to each other both transversely and angularly.

As shown in FIGS. 4A and 4B, the optical film 6d may be formed from two separate portions: a portion having a structured surface 10d and a substrate portion 12d. This structure may be produced, for example, by coating the substrate portion with a curable material, imparting the structured surface into the curable material, and curing the optical film 6d. Alternatively, a portion having a structured surface 10e and a substrate portion 12e of an optical film 6e may also be two separate films bonded together with a suitable adhesive 28, for example, as illustrated in FIGS. 5A and 5B. The adhesive 28 may include, but is not limited to, a pressure sensitive adhesive (PSA) or an ultraviolet (UV) light cured adhesive.

Figure 6A:
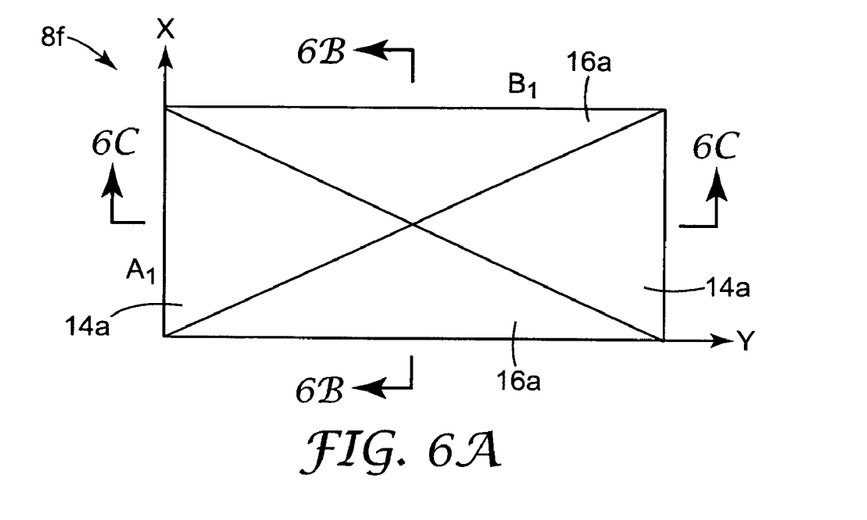
FIG. 6A shows schematically a top view of a rectangular-based prismatic structure of an exemplary optical film according to the present disclosure.
Figure 6B:
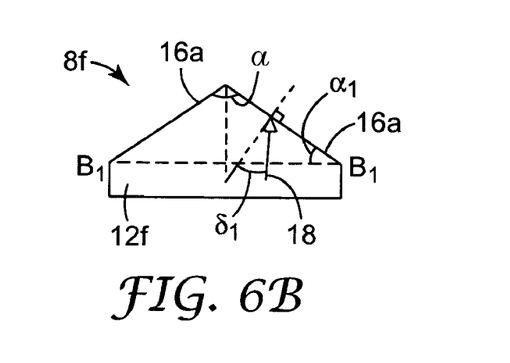
FIG. 6B shows schematically a cross-sectional view of the prismatic structure illustrated in FIG. 6A.
Figure 6C:
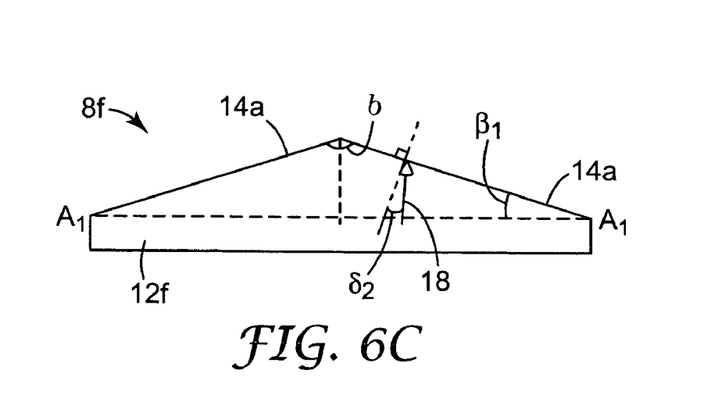
FIG. 6C shows schematically another cross-sectional view of the prismatic structure illustrated in FIG. 6A.

An exemplary embodiment of prismatic structures 8f according to the present disclosure is shown in FIGS. 6A–6C. FIG. 6A shows a top view of a prismatic structure 8f. The base of the prismatic structure 8f may be a four-sided shape with two first sides $A_1$, disposed generally opposite to each other along a direction Y, and two second sides $B_1$, disposed generally opposite to each other along a direction X. In typical embodiments of the present disclosure, the two first sides $A_1$ are substantially parallel to each other and the two second sides $B_1$ are substantially parallel to each other. In some exemplary embodiments, the first sides $A_1$ are substantially perpendicular to the second sides $B_1$. Thus, the base of the prismatic structure 8f may be substantially rectangular. Where the length of one pair of sides is greater then that of the other pair of sides, examplary aspect ratios may include 1.1, 1.4 and 3. The structures 8f may be further characterised by apex angles a and b, shown in FIGS. 6B and 6C. One of or both of the apex angles may be about 90 degrees, about 80 to about 100 degrees or about 60 to about 120 degrees.

FIG. 6B shows a cross-sectional view of an exemplary embodiment of a prismatic structure 8f in the 6B—6B plane as shown in FIG. 6A. The prismatic structure 8f includes two surfaces 16a. The prismatic structure 8f also includes an angle $\alpha_1$ measured between one of the surfaces 16a and a plane parallel to a substrate portion 12f. FIG. 6C shows a cross-sectional view of an exemplary embodiment of the prismatic structure 8f in the 6C—6C plane as shown in FIG. 6A. The prismatic structure 8f comprises two surfaces 14a. The prismatic structure 8f also includes an angle $\beta_1$ measured between one of the surfaces 14a and a plane parallel to the substrate portion 12f. The angle $\alpha_1$ is preferably at least as great as the angle $\beta_1$, and typically it is larger. In some exemplary embodiments, one of or both the angles $\alpha_1$ and $\beta_1$ can lie within the range of about 30 to about 60 degrees.

FIG. 6B and 6C show a light ray 18 traveling within the prismatic structure 8f. The surface 16a and the surface 14a may reflect or refract the light ray 18 depending on an incident angle $\delta_1$ or $\delta_2$ of the light ray 18 with respect to a normal to the surface 16a or the surface 14a. As one of ordinary skill in the art will understand from the present disclosure, selecting different angles $\alpha_1$ and $\beta_1$ allows one to control the angular spread of light transmitted through the prismatic structures 8f of an optical film 6. In some exemplary embodiments, the angles between the opposing pairs of surfaces and a plane parallel to a substrate portion are not equal to each other, which may be advantageous where a viewing axis is tilted with respect to a normal to the substrate portion.

Figure 7A:
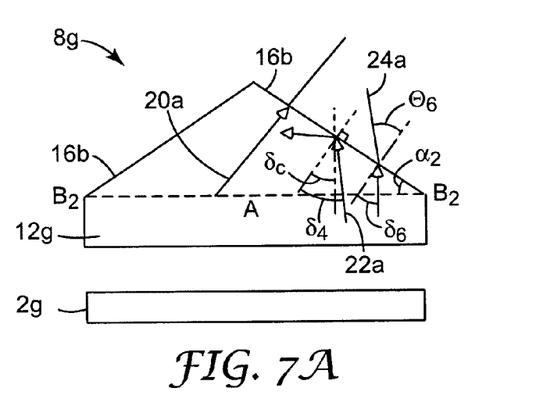
FIG. 7A shows schematically a cross-sectional view of a prismatic structure of an exemplary optical film according to the present disclosure, positioned over a backlight.
Figure 7B:
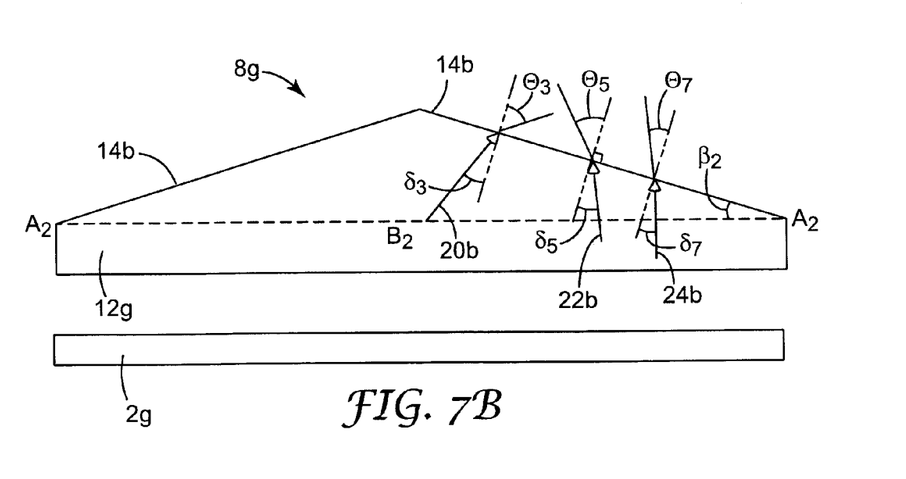
FIG. 7B shows schematically another cross-sectional view of the prismatic structure illustrated in FIG. 7A.

FIG. 7A shows a cross-sectional view of an exemplary embodiment of a prismatic structure 8g similar to the prismatic structure 8f shown in FIG. 6B. A light ray 20a, a light ray 22a, and a light ray 24a, emitted from a backlight 2g, propagate in the prismatic structure 8g. FIG. 7B shows a cross-sectional view of the exemplary embodiment of the prismatic structure 8g similar to the prismatic structure 8f shown in FIG. 6C. A light ray 20b, a light ray 22b, and a light ray 24b, which have the same directions as light rays 20a, 22a, and 24a respectively, originate from the backlight 2g and propagate in the prismatic structure 8g.

The following describes the travel of each of the light rays 20–24, originating from the backlight 2g, through the prismatic structures 8g of an exemplary optical film 6 of the present disclosure. FIGS. 7A and 7B show how a light ray may behave differently depending on whether it impacts one of the surfaces 16b or one of the surfaces 14b, and how the angular spread of light may be controlled in two separate directions by selecting an angle $\alpha_2$ of a surface 16b and an angle $\beta_2$ of a surface 14b. It should be noted that the light rays 20–24 are not drawn to precisely illustrate the angles of reflection and refraction of the light rays 20–24. The light rays 20–24 are only shown to illustrate schematically the general direction of travel of the light rays through the prismatic structure 8g.

In FIG. 7A, the light ray 20a originating from the backlight 2g travels in the prismatic structure 8g in a direction perpendicular to the surface 16b. Thus, the light ray 20a encounters the surface 16b in a direction perpendicular (or normal) to the surface 16b and an incident angle of the light ray 20a relative to the normal of the surface 16b is equal to zero (0) degrees.

A medium above the optical film 6 (e.g., optical film 6a–6e) and the surfaces 16b and 14b may be, for example, comprised substantially of air. However, the medium above the optical film 6 and the surfaces 16b and 14b may be comprised of any medium, material, or film known to those of ordinary skill in the art. As one or ordinary skill in the art would understand, air has a refractive index less than most known materials. Based on the principles of Snell's Law, when light encounters, or is incident upon, a medium having a lesser refraction index, the light ray is bent away from the normal at an exit angle $\theta$ relative to the normal that is greater than an incident angle $\delta$. However, a light ray which encounters a material-air boundary at surface such that it is normal to the surface (e.g., the light ray 20a) is not bent and continues to travel in a straight line as shown in FIG. 7A. Snell's Law can be expressed by the formula:

$n_i * \sin \delta = n_t * \sin \theta$, where,
- $n_i$ = the refractive index of the material on the side of incident light,
- $\delta$ = the incident angle,
- $n_t$ = the refractive index of the material on the side of transmitted light, and
- $\theta$ = the exit angle.

Those of ordinary skill in the art will understand that a certain amount of the incident light will also be reflected back into the prismatic structure 8g.

FIG. 7B shows the light ray 20b traveling in substantially the same direction as the light ray 20a. The light ray 20b encounters the surface 14b at the incident angle $\delta_3$ relative to a normal to the surface 14b. As discussed above, the angle $\beta_2$ of the surface 14b may be less than the angle $\alpha_2$ of the surface 16b. When that is the case, the incident angle $\delta_3$ of the light ray 20b is therefore not equal to the incident angle $\delta$ of the light ray 20a. The incident angle $\delta_3$ of the light ray 20b is not equal to zero (0) as shown in FIG. 7B, and the light ray 20b does not encounter the material-air boundary perpendicular to the surface 14b. The light ray 20b is refracted at an exit angle $\theta_3$ different from the incident angle $\delta_3$ at which it impacted the surface 14b based on the formula of Snell's Law.

As shown in FIG. 7A, the light ray 22a travels into the prismatic structure 8g and encounters the surface 16b at the incident angle $\delta_4$ relative to the normal to the surface 16b. The incident angle $\delta_4$ for the light ray 22a is greater than the critical angle $\delta_c$ at the surface 16b. The light ray 22a does not exit the prismatic structure 8g and is reflected back into the prismatic structure 8g. This is referred to as "total internal reflection." As described above, the light ray will behave according to the formula for refraction set forth above when traveling from a material having a higher refractive index to a material having a lower refractive index. According to the formula, the exit angle $\theta$ will approach 90 degrees as the incident angle increases. However, at the critical angle $\delta_c$, and for all angles greater than the critical angle $\delta_c$, there will be total internal reflection (e.g., the light ray will be reflected back into the prismatic structure 8g rather than being refracted and transmitted through the surface). As one of ordinary skill in the art would understand, the critical angle $\delta_c$ may be determined according to the Snell's Law (described above) by setting the exit angle (e.g., refraction angle) to 90 degrees and solving for the incident angle $\delta$.

As shown in FIG. 7B, the light ray 22b, traveling in substantially the same direction as the light ray 22a, encounters the surface 14b. If the angle $\beta_2$ of the surface 14b is less than the angle $\alpha_2$ of the surface 16b, the light ray 22b encounters the surface 14b at a different incident angle $\delta_5$ than the incident angle $\delta_4$ at which the light ray 22a encountered the surface 16b. The incident angle of light ray 22b is less than the critical angle $\delta_c$ and, therefore, the light ray 22b is refracted at the surface 14b and transmitted through the surface 14b.

The light ray 24a and the light ray 24b, shown in FIGS. 7A and 7B respectively, travel in the prismatic structure 8g in a direction perpendicular to the substrate portion 12g. The light rays 24a and 24b encounter the surface 16b and the surface 14b, respectively, at incident angles $\delta$ less than the critical angle $\delta_c$. However, the incident angle $\delta_6$ of the light ray 24a relative to the normal of the surface 16b is greater than the incident angle $\delta_7$ of the light ray 24b relative to the normal of the surface 14b. Hence, according to Snell's Law, the exit angle $\theta_6$ of the light ray 24a relative to the normal of the surface 16b will be different than the exit angle $\theta_7$ of the light ray relative to the normal to the surface 14b. As one of ordinary skill in the art would understand, the exit angle $\theta_6$ of the light ray 24a relative to the normal of the surface 16b will be greater than the exit angle $\theta_7$ of the light ray 24b relative to the normal of the surface 14b.

As one of ordinary skill in the art would understand, the surface 16b with the larger angle $\alpha_2$ may generally "focus" more light toward a direction perpendicular to the backlight 2g than the surface 16b with the lesser angle $\beta_2$. Thus, the optical film 6 (e.g., optical film 6a–6e) with prismatic structures 8 (e.g., prismatic structures 8a–8g) as described may allow a greater angular spread of light along one direction and a lesser angular spread of light along another direction. In some exemplary embodiments, the angular spread of light transmitted through an exemplary optical film of the present disclosure may be greater along the direction collinear with the longer sides of the prismatic structures and it may be smaller along the direction collinear with the shorter sides of the prismatic structures.

The optical film 6 of the present disclosure may be employed in an LCD television to provide a wider angular spread of light in a first direction, e.g., the horizontal direction, and a lesser but still substantial angular spread of light in a second direction, e.g., the vertical direction. This may be advantageous to accommodate the normally wider field of view in the horizontal direction (e.g., viewers on either side of the television) than in the vertical direction (e.g., viewers standing or sitting). In some exemplary embodiments, the viewing axis may be tilted downward, such as where a viewer may be sitting on the floor. By reducing the angular spread of light in the vertical direction, a resultant optical gain may be experienced in a desired viewing angle range. In some other exemplary embodiments of the optical film 6 (e.g., optical film 6d with prismatic structures 8d), the angular spread of light may be equal in the first and the second directions.

Figure 8A:
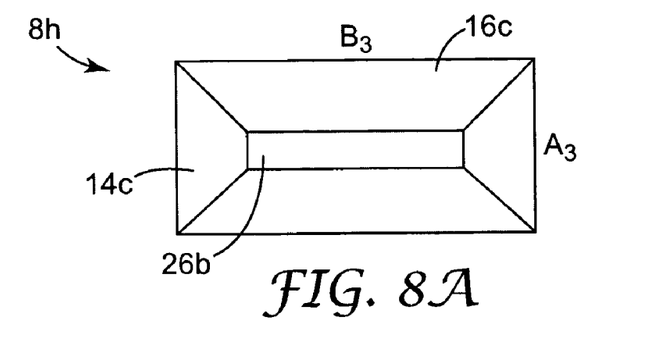
FIG. 8A shows schematically a top view of a prismatic structure of an exemplary optical film according to the present disclosure.
Figure 8B:
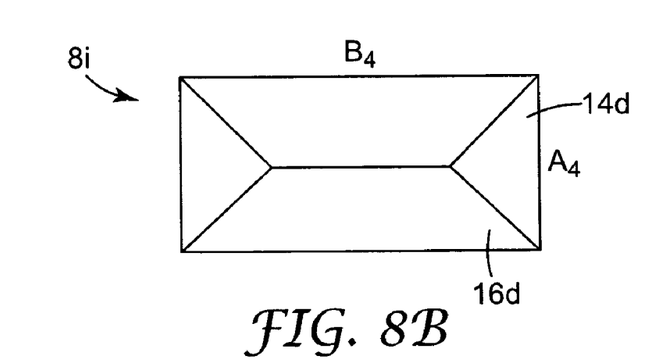
FIG. 8B shows schematically a top view of another prismatic structure of an exemplary optical film according to the present disclosure.
Figure 8C:
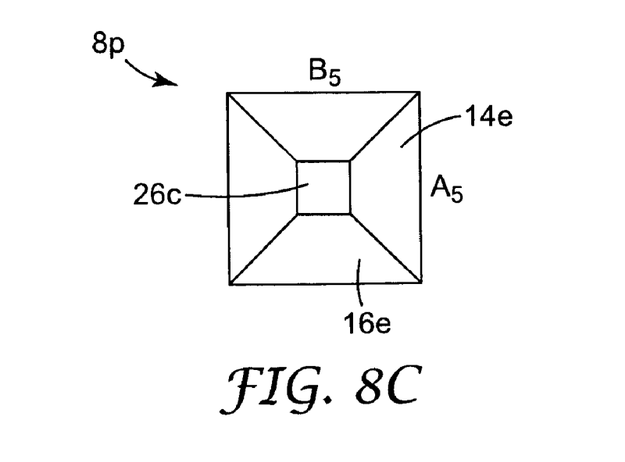
FIG. 8C shows schematically a top view of another prismatic structure of an exemplary optical film according to the present disclosure.

FIGS. 8A–8C illustrate further exemplary embodiments of one of the prismatic structures 8 according to the present disclosure. FIG. 8A shows a prismatic structure 8h having two opposing first sides $A_3$ and two opposing second sides $B_3$; the length of $A_3$ is less than the length of $B_3$. The prismatic structure 8h also includes two surfaces 14c and two surfaces 16c. In this exemplary embodiment, the prismatic structure 8h further includes a substantially flat surface 26b which occupies a sufficiently small area to maintain an optical gain of at least about 1.1. The flat surface 26b may be useful, for example, when bonding an additional optical film or substrate on top of the prismatic structures 8h of the structured surface 10 (e.g., structured surface 10a–10e). Furthermore, the flat surface may aid in transmitting more light in the direction perpendicular to the display (i.e., the direction along which the viewer is most likely to view the screen). The surface 26b may be raised or it may be depressed. In some exemplary embodiments, the surface 26b may be rounded.

FIG. 8B shows a prismatic structure 8i having two opposing first sides $A_4$ and two opposing second sides $B_4$. In this exemplary embodiment, the two surfaces 14d are of a substantially triangular shape and the two surfaces 16d are of a substantially trapezoidal shape. It is contemplated that the prismatic structure 8i may be of any other construction with two opposing first sides $A_4$ and two opposing second sides $B_4$.

FIG. 8C shows another prismatic structure 8p having two opposing first sides $A_5$ and two opposing second sides $B_5$; the length of $A_5$ is equal to the length of $B_5$. The prismatic structure 8p also includes two surfaces 14e and two surfaces 16e. The prismatic structure 8p further includes a flat surface 26c. In some exemplary embodiments, the surface 26c may be rounded.

It will be apparent to those skilled in the art that various modifications and variations can be made in the structure and the methodology of the present disclosure, without departing from the spirit or scope of the invention. Thus, it is intended that the present disclosure cover the modifications and variations of the exemplary embodiments described herein, provided that they come within the scope of the appended claims and their equivalents.

What is claimed is:

1. An optical film having a first surface and a structured surface, the structured surface comprising a plurality of prismatic structures, each structure having a base including at least two first sides and at least two second sides, a first side having a different length than a second side, wherein each of the plurality of prismatic structures comprises five substantially planar surfaces, four surfaces being attached to the base, each of the four surfaces positioned to angle in from the base toward the fifth surface;
    wherein at least one of the first and second sides of at least one of the plurality of prismatic structures is offset with respect to at least one of the first and second sides of at least one other prismatic structure; and
    wherein light enters the optical film through either the surface or the structured surface.

2. The optical film as recited in claim 1, wherein the two first sides are disposed opposite to each other along a first general direction and the two second sides are disposed opposite to each other along a second general direction,
    wherein the optical film transmits a substantial portion of light incident on the first surface along the first general direction when an angle of incidence is within a first angle with respect to an axis disposed at an angle to the first surface and reflects a substantial portion of light when the angle of incidence is outside the first angle, and
    wherein the optical film transmits a substantial portion of light incident on the first surface along the second general direction when an angle of incidence is within a second angle with respect to the axis and reflects a substantial portion of light when the angle of in incidence is outside the second angle.

3. The optical film as recited in claim 2, wherein the axis is generally orthogonal to the first surface.

4. The optical film according to claim 2, wherein the first angle is different from the second angle.

5. The optical film according to claim 1, wherein the base has a generally rectangular shape.

6. The optical film according to claim 1, wherein each of the plurality of prismatic structures is further characterized by an apex angle that lies within a range of about 60 degrees to about 120 degrees.

7. The optical film according to claim 1, wherein each of the plurality of prismatic structures is arranged in contact with at least one other prismatic structure.

8. The optical film according to claim 1, wherein the optical film further comprises a substrate portion having an additional optical characteristic different from an optical characteristic of the structured surface.

9. The optical film according to claim 8, wherein the substrate portion comprises at least one of: a polarizer, a diffuser, a brightness enhancing film, a turning film and any combination thereof.

10. An optical device comprising a light source and the optical film of claim 1 disposed so that the structured surface faces away from the light source.

11. The optical device of claim 10, further comprising a lightguide disposed between the light source and the optical film.

12. The optical device according to claim 10, further comprising a light valve arrangement disposed to receive light transmitted through the optical film.

13. An optical film having a first surface and a structured surface, the structured surface comprising a plurality of prismatic structures, each structure having a base including at least two first sides and at least two second sides, a first side having a different length than a second side, wherein each of the plurality of prismatic structures comprises five substantially planar surfaces, four surfaces being attached to the base, each of the four surfaces positioned to angle in from the base toward the fifth surface;
    wherein at least one of the first and second sides of at least one of the plurality of prismatic structures is transversely offset with respect to at least one of the first and second sides of at least one other prismatic structure; and
    wherein light enter the optical film through either the first surface or the structured surface.

14. The optical film according to claim 13, wherein the base has a generally rectangular shape.

15. The optical film according to claim 13, wherein the bases of the plurality of prismatic structures are disposed so that the first and second sides are substantially parallel to one another.

16. The optical film according to claim 13, wherein the optical film further comprises a substrate portion having an additional optical characteristic different from an optical characteristic of the structured surface.

17. The optical film according to claim 13, wherein the first and second sides of at least one of the plurality of prismatic structures are transversely offset with respect to at least one of the first and second sides of at least one other prismatic structure by first and second distances respectively.

18. The optical film according to claim 17, wherein the first distance is different from the second distance.

19. An optical film having a first surface and a structured surface, the structured surface comprising a plurality of prismatic structures, each structure having a base including at least two first sides and at least two second sides, a first side having a different length than a second sides, wherein each of the plurality of prismatic structures comprises five substantially planar surfaces, four surfaces being attached to the base, each of the four surfaces positioned to angle in from the base toward the fifth surface;
    wherein at least one of the first and second sides of at least one of the plurality of prismatic structures is angularly offset with respect to at least one of the first and second sides of at least one other prismatic structure; and
    wherein light enters the optical film through either the first surface or the structured surface.

20. The optical device according to claim 19 wherein the base has a generally rectangular shape.

21. The optical film according to claim 19, wherein the bases of the plurality of prismatic structures are disposed so that the angular offset varies across the structured surface.

22. The optical film according to claim 19, wherein the optical film further comprises a substrate portion having an additional optical characteristic different from an optical characteristic of the structured surface.

* * * * *

UNITED STATES PATENT AND TRADEMARK OFFICE
CERTIFICATE OF CORRECTION

PATENT NO. : 7,220,026 B2  Page 1 of 1
APPLICATION NO. : 11/026938
DATED : May 22, 2007
INVENTOR(S) : Byung-Soo Ko It is certified that error appears in the above-identified patent and that said Letters Patent is hereby corrected as shown below:

Title Page,
Column 2, Line 1, Under Other Publications, after "Modeling" insert -- , --.

Column 1,
Line 9, before "disposed" delete "structures".

Column 6,
Line 36, after "thereof" insert -- . --.

Column 8,
Line 4, delete "FIG." and insert -- FIGS. --, therefor.

Column 11,
Line 28, before "surface" insert -- first --.
Line 44, after "of" delete "in".

Column 12,
Line 23, delete "enter" and insert -- enters --, therefor.
Line 46, delete "sides," and insert -- side, --, therefor.
Line 57, before "wherein" insert -- , --.

Signed and Sealed this

Sixteenth Day of October, 2007

JON W. DUDAS
*Director of the United States Patent and Trademark Office*